Dec. 31, 1935. F. I. GETTY 2,025,980
CIRCUIT CLOSER FOR STEERING WHEELS
Filed May 29, 1935 2 Sheets-Sheet 1

Inventor
Fred I. Getty

By Brown & Phelps
Attorneys

Dec. 31, 1935.  F. I. GETTY  2,025,980
CIRCUIT CLOSER FOR STEERING WHEELS
Filed May 29, 1935  2 Sheets-Sheet 2
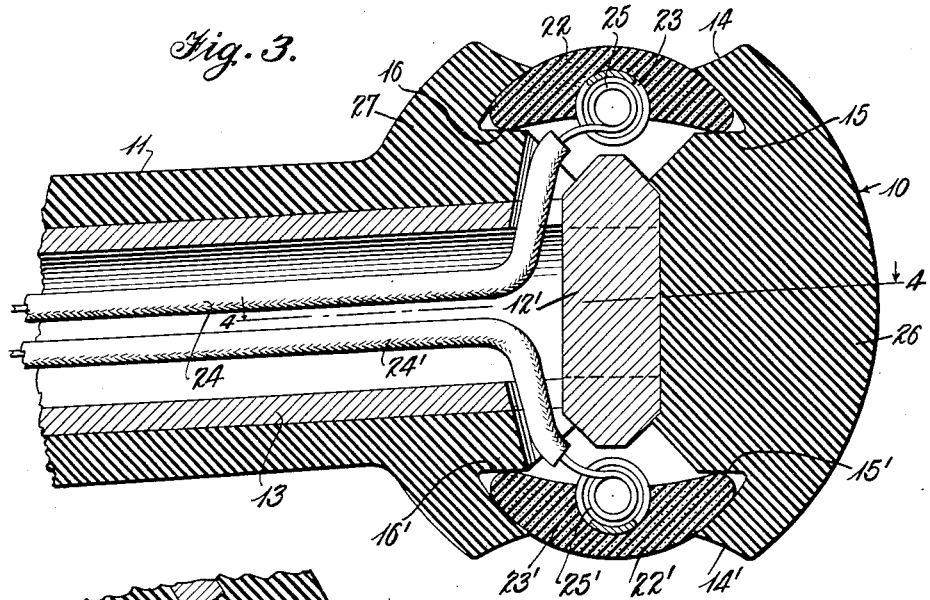
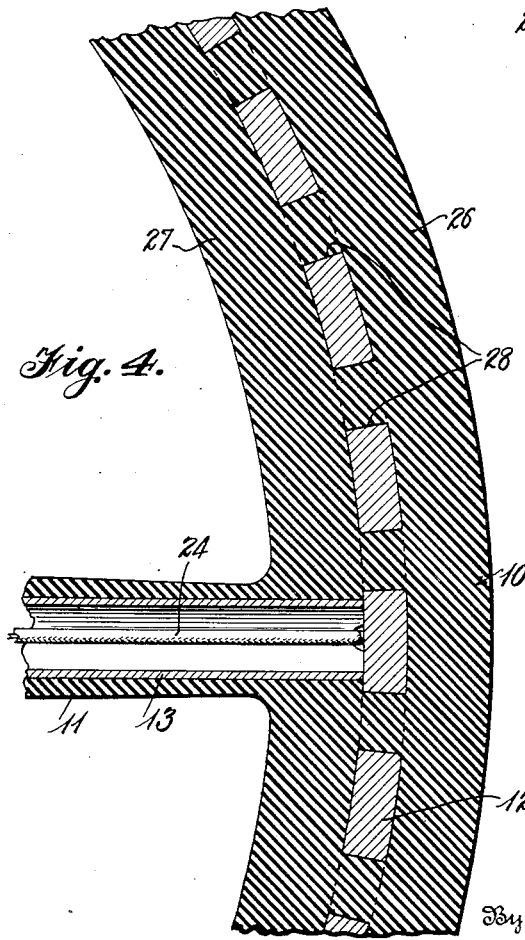
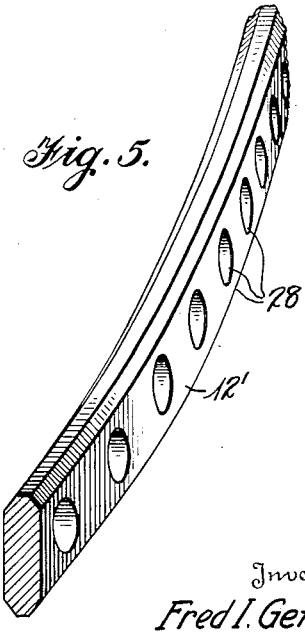
Inventor
Fred I. Getty Patented Dec. 31, 1935

2,025,980

UNITED STATES PATENT OFFICE 2,025,980

CIRCUIT CLOSER FOR STEERING WHEELS

Fred I. Getty, Jennings, La.

Application May 29, 1935, Serial No. 24,116

6 Claims. (Cl. 200—59)

The invention relates to circuit closers for steering wheels and has as an object the provision of a circuit closer constructed to be operated by very slight pressure upon the movable member.

It is a further object of the invention to provide a multiple circuit closer built into the rim of a steering wheel having means to make integral various portions of the rim.

It is a further object to provide means for making a connection between a movable contact and a conductor which will not be subject to breakage by repeated movements of the movable contact.

Further objects of the invention will appear from the following description when read in connection with the accompanying drawings showing illustrative embodiments of the invention, and wherein:—

Fig. 3 is a section similar to Fig. 2 showing another form of the invention;

Fig. 4 is a central horizontal section on line 4—4 of Fig. 3; and

Fig. 5 is a detail perspective view of a portion of the metallic core of Figs. 3 and 4.

Figure 1:
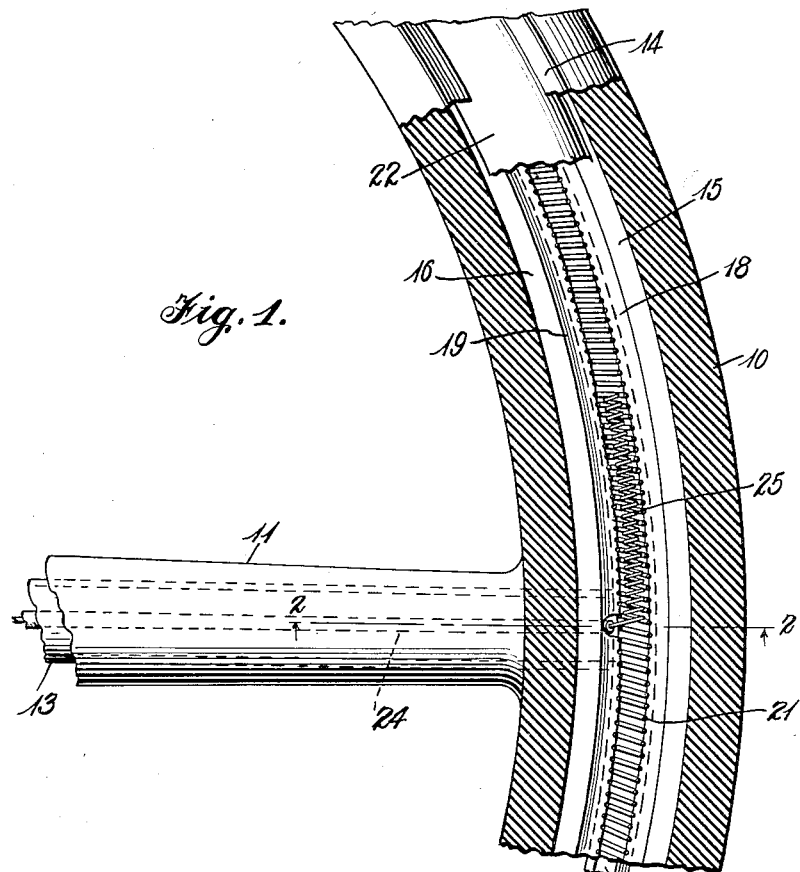
Fig. 1 is a plan view partly in horizontal section through a portion of the rim of a steering wheel.

As shown the device is applied to a rim 10 of a steering wheel whereof one of the spokes is indicated at 11. The wheel is shown as comprising a metallic core 12 shown as secured to and grounded upon the hollow metallic core 13 of the spoke 11. The rim 10 is shown as formed with an annular groove 14 formed with ledges 15, 16 intermediate its height, the surface of the groove above said ledges formed upon arcs of circles 17, 18 to meet the exposed surface of the groove. From the ledges 15, 16, the groove is shown as sloping downwardly and inwardly at 18, 19 to expose the core 12 in the bottom of the groove, which core is shown as chamfered and terminating in a central plane portion 20 to comprise a fixed contact.

A movable contact is shown in the form of an endless band 21 of helically coiled material normally held in spaced relation to the contact 20. To support the band 21 yieldably in such spaced relation to the contact 20, there is shown a flexible closure 22 desirably formed of resilient material as soft rubber which is formed with an arcuate recess 23 into which the band 20 seats, the recess embracing more than one-half of the band so as to interlock the band with the material of the closure 22.

In the making of a connection between a conductor wire as 24 with such a movable contact, if the conductor wire be soldered directly to the movable contact, the operating movements of the contact are found to cause fracture of the connection. To make a connection which is not liable to such fracture, in accordance with the invention a supplemental portion 25 is provided in telescoping relation with the helix of the band and the conductor 24 is soldered to the supplemental portion 25. As shown the portion 25 is telescoped within the contact 21 which is the preferred relation of the parts but it will be understood that the portion 25 may be telescoped over the band 21 if desired.

Figure 2:
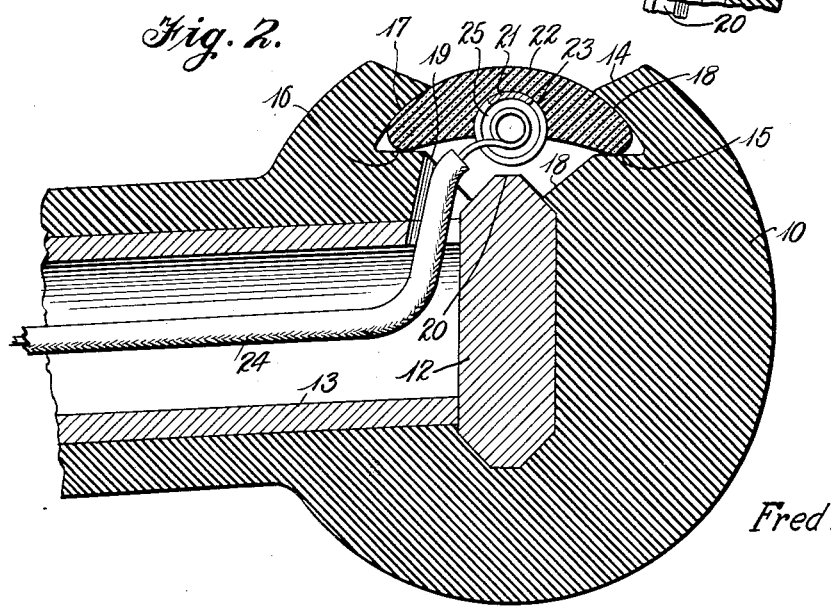
Fig. 2 is a vertical transverse section on line 2—2 of Fig. 1.

In the form of the invention of Figs. 3 to 5 inclusive, two grooves 14 and 14' are shown, one at the upper portion and one at the lower portion of the rim. The structure of each of the circuit closers in grooves 14 and 14' is the same as that shown in Figs. 1 and 2. In this structure however the outer portion 26 of the rim will be seen to be entirely separated from the inner portion 27 thereof. To provide for an integral connection between the two portions 26 and 27, the core 12' of Figs. 3 and 4 is provided with openings 28, as shown in Figs. 4 and 5, through which the material of portions 26 and 27 may be pressed while in plastic form, these portions being desirably formed of hard rubber, synthetic resin or the like.

Because the closure 22 is supported at its ends only upon the ledges 15, 16, which ends are relatively widely spaced from the movable contact 21, only a slight pressure upon the exposed portion of the closure 22 in the groove 14 will be necessary to bring the contacts into engagement.

Since the core 12 is a grounded contact, being grounded upon the spoke portions 13 and the movable contact 21 is entirely insulated from the wheel rim, it will be seen that the entire wheel rim may be made of metal instead of the core 12 only, if desired.

Minor changes may be made in the physical embodiments of the invention within the scope of the appended claims without departing from the spirit thereof.

I claim:

1. A circuit closer for steering wheels comprising, in combination: a wheel rim having an annular groove formed with relatively widely spaced under-cut portions; an annular closure for said groove comprising resilient material interlocking with said under-cut portions and arching over the space therebetween; a metallic portion of said rim exposed at the bottom of said groove forming a fixed contact; and a movable contact interlocking with the material of said closure and thereby held in spaced relation with said fixed contact; whereby said contacts may be brought into mutual engagement by relatively slight pressure upon the exterior of said closure.

2. A circuit closer for steering wheels comprising, in combination: a wheel rim having an annular groove; said groove formed with closure-supporting edges spaced from the bottom thereof and with side walls overhanging said ledges; a resilient annular closure for said groove supported at its edges by said ledges, underlapping said overhanging portions and arching over the space therebetween; a metallic portion of said rim exposed at the bottom of said groove and grounded on spokes of the wheel; and a movable contact interlocking with the material of said closure and thereby held in spaced relation with said metallic portion to be brought into contact therewith by slight pressure upon the exterior of the closure.

3. A circuit closer for steering wheels comprising, in combination: a wheel rim having an annular groove; a fixed contact in said groove; a movable contact comprising a band of helically coiled wire supported in normally spaced relation to said fixed contact; resilient means to preserve normal separation of said contacts; a supplemental portion of helically coiled wire in telescoping relation and contact with a portion of said band; and a conductor electrically connected to said supplemental portion.

4. A circuit closer for steering wheels comprising in combination: a steering wheel comprising metallic spoke portions; a metallic rim-core secured to the ends of said spoke portions; said core comprising a band of metal formed with radial perforations; inner and outer sheath portions for said core mutually interlocking through said perforations; said sheath portions cut away at the edges of said core to form upper and lower annular grooves in the assembled rim exposing said core at the bottom of each groove; movable contacts supported adjacent said grooves; resilient means holding said contacts normally spaced from said core at each groove and yieldable to permit engagement of the contacts with the core; and electrical conductors connected to the respective contacts.

5. An electrical contact member and conductor connection thereto comprising, in combination: an endless band of helically coiled wire comprising the movable member of a circuit closer; a supplemental portion of helically coiled wire in telescoping relation and in physical contact with a portion of said band; and an electrical conductor secured to said supplemental portion.

6. An electrical contact member and conductor connection thereto comprising, in combination: an endless band of helically coiled wire comprising the movable member of a circuit closer; a supplemental portion of helically coiled wire telescoped within and in physical contact with a portion of said band; and an electrical conductor secured to said supplemental portion.

FRED I. GETTY.